United States Patent [19]

White

[11] 4,275,385

[45] Jun. 23, 1981

[54] INFRARED PERSONNEL LOCATOR SYSTEM

[75] Inventor: Lester L. White, Indianapolis, Ind.

[73] Assignee: Bell Telephone Laboratories, Incorporated, Murray Hill, N.J.

[21] Appl. No.: 65,876

[22] Filed: Aug. 13, 1979

[51] Int. Cl.[3] .......... G01J 1/00; G01S 9/56

[52] U.S. Cl. .......... 340/312; 340/525; 250/338

[58] Field of Search .......... 340/152 R, 152 T, 311, 340/312, 524, 525; 250/336, 338, 349

[56] References Cited

U.S. PATENT DOCUMENTS

| | | | |
|---|---|---|---|
| 3,439,320 | 4/1969 | Ward | 340/16 |
| 3,478,344 | 11/1969 | Schwitzgebel et al. | 340/312 |
| 3,696,384 | 10/1972 | Lester | 340/312 |
| 3,739,329 | 6/1973 | Lester | 340/16 |
| 4,025,791 | 5/1977 | Lennington et al. | 250/338 |
| 4,121,102 | 10/1978 | Wilson | 250/338 |
| 4,151,407 | 4/1979 | McBride | 250/199 |

OTHER PUBLICATIONS

Intel Component Data Catalog, 1978; 8048/8748/8035 Single Component 8-Bit Microprocessor; pp. 10-10-1-0-17.

The Western Electric Engr.; 7/1977; MAC-8 Microprocessor, pp. 41-47.

Electronic Design, 2/1977, IR-Activated Headphone, p. 13.

Electronics, 10/14/76, Audio IR Headsets Do Well in Germany, pp. 31-32.

Electronics, 12/22/77, Two-Chip Set Uses Infrared Pulse to Control TVs, p. 119.

G.E.-Tech. Training Man., TV 1978 Line, 7/1977, Remote/Electronic Tuning Syst., pp. 1-2, 6-9.

LED Ckts. & Projects by Forrest Mims, III, 1973, Chap. 5, LED Comm. Syst., pp. 101-130.

*Primary Examiner*—Alvin H. Waring

*Attorney, Agent, or Firm*—John A. Caccuro

[57] ABSTRACT

An infrared personnel locator system using a periodic unique infrared identification code emitted from a battery-powered transmitter unit to identify the person carrying the transmitter unit to an overhead infrared receiver as the person enters the receiver's monitoring zone. The transmitter unit identification code together with the receiver identification code is communicated to a common control unit which displays the location of all of the transmitter units. For paging, the system provides alerting units which are selectively operated in the zone closest to the person being paged. Additionally, the system controls electronic locks for restricting access of users to certain locations or equipment. A telephone interface provides system access from the telephone network.

22 Claims, 11 Drawing Figures

TRANSMITTER

RECEIVER

TRANSMITTER

INFRARED PERSONNEL LOCATOR SYSTEM

TECHNICAL FIELD

This invention relates to electronic personnel locating systems and, more particularly, to an infrared personnel locator system.

BACKGROUND OF THE INVENTION

The increased mobility of society and the need for maintaining swift and efficient communications has resulted in the development of paging systems. Paging systems are usually divided into two distinct groups; on-site and area-wide. The area-wide paging system is used for contacting personnel over large geographic areas. The on-site paging systems are used for locating personnel within a particular building or facility. A typical use of on-site paging systems include the location of personnel in hospitals and high security institutions such as military, installations and prisons.

Presently available on-site paging systems generally include a network of loudspeakers, lamp displays or radio units. These paging systems are typically of the broadcast variety and usually do not know the location of the paged party.

Another technique for locating and contacting personnel consists of scanning a transmitting unit, on the person to be located, to monitor the location of the person at all times. These personnel locating systems usually include an ultrasonic transmitting unit, carried by the person to be located, which are either scanned or manually activated to transmit a unique ultrasonic signal to a network of receivers distributed throughout a building. With these personnel locating systems since the location of personnel is known at all times any need for paging can be eliminated or highly selective in scope.

Typical applications of ultrasonics in personnel locating systems are described in U.S. Pat. Nos. 3,439,320; 3,696,384 and 3,739,329.

These prior art ultrasonic personnel locating systems (PLS) include a portable battery-powered transceiver that is periodically scanned and which responds to signals from remote receiving locations throughout the facility. Since the transceiver operates only when scanned, power consumption is kept low. Utilizing the scan/respond transmission format results in the transceiver sometimes being in a "dead zone" during the scan cycle and hence a "temporary lost personnel" status would result. Additionally, since the distance from the transceiver unit to the remote receiver location is variable the transmitter design must accommodate worst case transmission ranges at the expense of additional power requirements.

Another problem exists with these prior art ultrasonic personnel locating systems due to their susceptibility to ultrasonic noise. In most applications there is heavy ultrasonic background noise which interferes with the operation of the ultrasonic personnel locating systems. Additionally, ultrasonic signals are easily reflected by walls, cabinets, furniture, etc., which provides multipath signal interference. Since ultrasonic signals travel only at the speed of sound, the longer propagation delay of the reflected signal produces a more troublesome multipath interference signal. Finally, the limited bandwidth of ultrasonic signals limits the number of unique codes that can be assigned to the portable units.

Prior art infrared techniques include the use of an infrared transmitter to communicate analog music information from a music receiver or amplifier to a portable infrared headset receiver. The infrared transmitter in such a design is not portable and utilizes energy inefficient analogue modulation techniques. Since the portable receiver merely detects the signal and drives an efficient close coupled headset to provide music to the listener much less power is required than for a portable transmitter design.

Other prior art infrared techniques include the use of an infrared battery powered transmitter for remote control of the channel selection volume and on/off controls of a television receiver. Since these controls are used only when manually activated by the user, the transmission can be inefficient and yet still utilize low battery power.

The application of these known infrared techniques to a portable battery-powered transmitter for use in a personnel locating system design would require a manual operation by the user each time he entered a room.

It is therefore a problem to design an infrared personnel locator system having a low power dissipation battery-powered portable transmitter which transmits a periodic unique infrared identification code identifying the person carrying the transmitter unit to a plurality of remote infrared receiver units.

DISCLOSURE OF THE INVENTION

The foregoing problems are solved by an infrared personnel locating system (PLS) consisting of a plurality of battery-powered portable infrared transmitter units, each adopted to be carried by an individual, and a plurality of remote infrared receiver units mounted in appropriate locations throughout a premises. Thus, an individual whose location is to be monitored is provided with a battery powered portable transmitter that is worn on the individual's shirt or blouse. The portable transmitter periodically generates a unique code word associated with the individual. This code is then transmitted in the form of high energy infrared pulses to be received by a plurality of infrared receivers mounted overhead in appropriate locations, such as over the doorway to each room.

As persons wearing the transmitters pass beneath the receivers the continuously generated code words are detected by the remote receivers. In one arrangement, the code words are immediately transmitted by the remote receivers along with a code word identifying the receiver's location to a common control unit. In another arrangement the code word is stored in a temporary memory and the control unit sequentially scans each of the remote receiver memories. In both arrangements, by combining the identity of the individual associated with the transmitter code word with the location of the remote receiver that had received the code word, the individual's location is ascertained.

In another arrangement the mobility or access of individuals can be restricted by locking appropriate doors and cabinets when certain coded portable transmitter units approach a restricted area.

The received transmitter infrared identifying signals along with the receiver location information must be processed by a common control unit to assure the validity of the data. The received signals are checked using framing and parity bit verification. If a valid identification signal is detected, this information, along with the location and time of day data, is stored in a common control memory. The memory for any given individual will contain his present location and the time of reception of the information, as well as information on his previous location. This scheme provides vectoring information to determine direction of personnel movement as well as the last time and place of detection.

Providing access to the location information is the final requirement of the infrared PLS. This interaction is achieved by the use of a master terminal and remote access terminals. These terminals allow personnel to initiate requests and receive location information. The master terminal consists of a keyboard and cathode ray tube. This terminal is used to enter all changes to the infrared PLS. For example, the assignment of transmitters to the various users are made from this terminal. Remote access terminals consisting of a small keyboard and alphanumeric display are located throughout the facility and also allow easy access to personnel location information. A locator system such as the infrared PLS, can be used in conjunction with paging and telephone systems to provide rapid communications.

The use of infrared signaling rather than ultrasonic signaling offers several advantages. Infrared signaling with its line of sight transmission path improves the selectivity of the receiver units by reducing signal reflections. Additionally, since infrared signals travel at the speed of light any multipath reflections or interference will have minimal delay reducing the problems caused by reflections. Due to the fast propagation rate of infrared signals, information can be transmitted in very short bursts of energy with reduced signal spreading. The use of a periodic burst mode of transmission rather than a continuous mode of signal transmission reduces the power consumption of the portable transmitter unit. This reduced power requirement enables the use of rechargeable battery powered transmitter units having a reasonable operating cycle. Additionally, since the communication path between the transmitter and receiver units are fairly constant the infrared pulse power of the transmitter can be limited, thus reducing battery drain.

The use of infrared signaling enables a wider bandwidth signal and greater amount of information transmission capacity. Thus, thousands of unique transmitter codes are possible in such a system. Additionally, at high information transmission rates the ambient noise presents less of a problem to an infrared system than to a comparable ultrasonic system. The alignment of the receivers to receive an upward infrared signal also minimizes the interference from incandescent lamps and solar energy signals.

The above advantages of infrared signal transmission over ultrasonic signal transmission are gained without some of the disadvantages of radio frequency (RF) signal transmission. For example, an infrared system does not require an FCC license to operate as does an RF system. Additionally, the infrared system, requires less elaborate circuitry and antennas than a comparable RF system. Thus, relatively inexpensive infrared transducers replace the expensive and larger antenna used in an RF system.

The flexibility of an RF signal transmission modes, however, is also available to infrared transmission modes. Thus, transmission modes such as amplitude and frequency modulation using the same techniques as used in RF transmission are possible with infrared transmission.

It is therefore a feature of the present invention to provide a personnel locating system including a plurality of battery powered portable units each adapted to be carried by an individual which communicates using infrared signals with a plurality of remote stations mounted in appropriate locations about a premises.

It is a further feature of the present invention that each portable unit periodically generates a unique pulse coded infrared sequence which includes framing and parity information.

It is an additional feature of the present invention that the remote units communicate with a control unit which stores personnel location information and provides for access to the personnel locating system.

It is still a further feature of the present invention to provide control signals from the control unit which can selectively restrict personnel access to certain locations and/or equipment.

These and other features of the present invention will become apparent from the system description and attached drawings.

BRIEF DESCRIPTION OF THE DRAWINGS

The operation and utilization of the disclosed invention will be more apparent from the following detailed description taken in conjunction with the drawings in which.

DETAILED DESCRIPTION

Background

A personnel locator system's (PLS) basic function is to provide the whereabouts of participating persons upon request. The overall system requirements to provide this function will now be discussed. A detailed description of each component of the system is given later in this specification.

The first requirement of a locator system entails identifying the individuals to be located. Each person must present a unique input into the system. In general, this input can be provided by either passive or active units. The passive units require a manual effort to enter identification information. Examples include optically or magnetically encoded cards, data terminals, and switchboards. Using this type of identification, therefore requires a conscious effort by the individuals. For very mobile persons, such as doctors, the frequency of entry may be quite high, placing a burden on the user. Considering these disadvantages, an active unit is more desirable.

Active units are battery powered transmitters that require no manual effort by the user. Several technologies are feasible for use in the system including ultrasound, radio, and infrared radiations. The infrared technology has several advantages for use in a personnel locator system. The transducers are efficient and economic. Multipath distortion is insignificant at the signal bandwidth required. Infrared is easily used in a line-of-sight mode to control transmission range. Finally, FCC licensing is not required.

GENERAL DESCRIPTION

Figure 1:
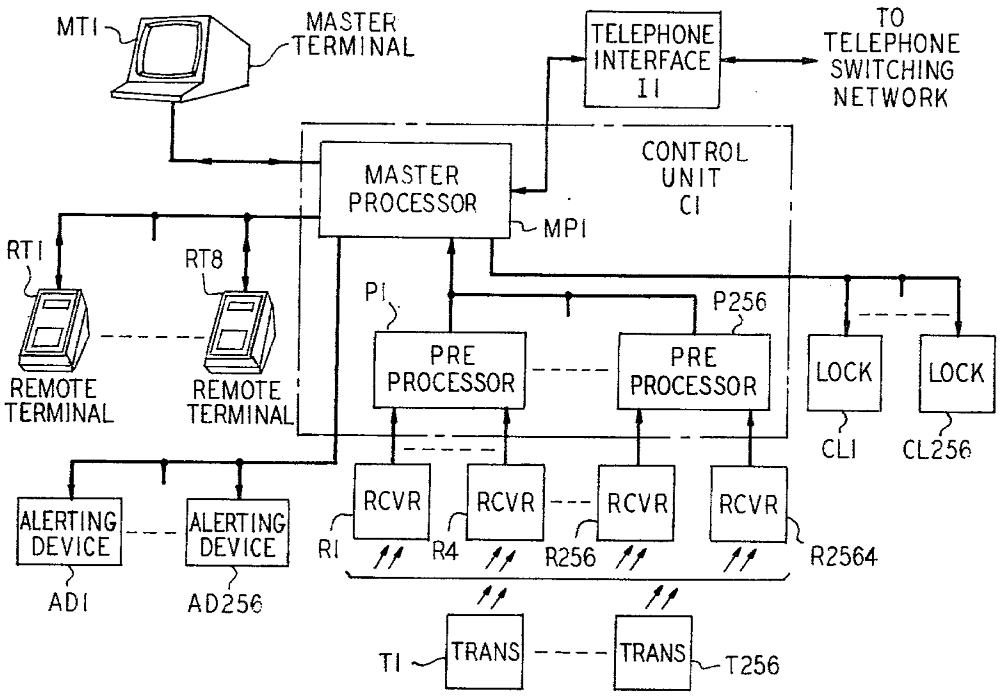
FIG. 1 shows a block diagram of an embodiment of the infrared personnel locating system.

Referring to FIG. 1 there is shown a block diagram of the disclosed infrared personnel locator system (PLS). Portable battery powered transmitter units (FIG. 2) designated in FIG. 1 as T1 through T256 periodically communicate via infrared signals to remote receiver stations R1 through R2564. The respective numbers of transmitter, receiver and other units shown in the PLS of FIG. 1 is for the purpose of illustrating the potential large number of units which can be accommodated in an infrared PLS.

Figure 3:
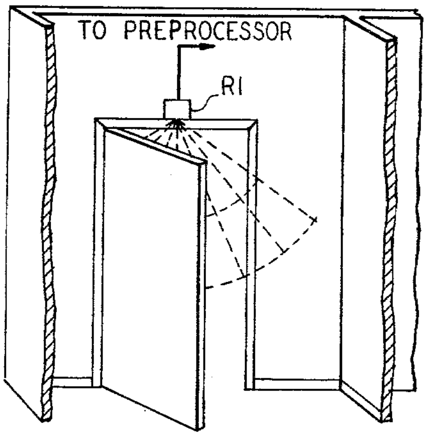
FIG. 3 shows a pictorial representation of a typical mounting of a remote receiver station.

Remote receiver stations R1-R2564 provide a method of defining the location of each person carrying a transmitter unit T1-T256. It is desirable that the definition of location or zones be as flexible as possible in its size, number of entranceways, etc. The infrared PLS uses receivers strategically located within the facility to define zones. These receivers are typically placed over doorways, hallways, etc., as shown in FIG. 3. The receiver detects the transmitter signal as the user passes nearby and converts it into usable electrical signals.

Remote receiver stations R1-R2564 can communicate with control unit C1 over wire, cable or by radio transmission. In FIG. 1 a wire transmission medium is shown connecting receiver stations R1-R2564 with preprocessors P1-P256 of control unit C1.

Preprocessors P1-P256 provide a means whereby serial data from the receiver stations R1-R2564 is tested for validity and converted into parallel data and communicated to the master processor MP1 for further processing.

Master terminal MT1 provides operator keyboard access and display capability for the infrared PLS. Depending on the programming of master processor MP1 various presentations of the location of transmitter units T1-T256 relative to receiver stations R1-R2564 can be displayed.

Remote terminals RT1-RT25 provide a convenient but more limited access and display interface with master processor MP1 than does master terminal MT1.

Telephone interface I1 provides an arrangement which enables phone calls received from a telephone switching network to automatically follow personnel within a facility utilizing the infrared PLS.

Where limited access to various locations or equipment within a facility is desirable, controllable locks CL1-CL256 controlled by master processor MP1 are available in the infrared PLS. In security oriented businesses, an infrared PLS augments or replaces existing security systems. Access to and movement within security areas is controlled and monitored by the infrared PLS. An infrared PLS, by controlling locks, CL1-CL256 allows entrance to a secure area under software control. Within the secure areas, an infrared PLS replaces or supplements video surveillance methods.

Additionally, controllable alerting devices AD-1-AD256 provide means for alerting a person to be located. These alerting devices can include a local telephone, bell, light, speaker, etc.

INFRARED TRANSMITTERS

Figure 2:
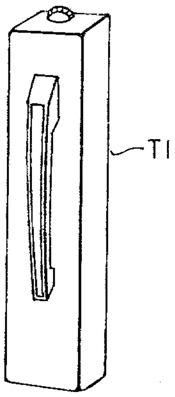
FIG. 2 shows a pictorial representation of a portable infrared transmitter unit.

Infrared transmitter units such as shown in FIG. 2 are worn by users and are detected by remote receivers as shown in FIG. 3 located throughout the facility or premises monitored by an infrared PLS.

Figure 6:
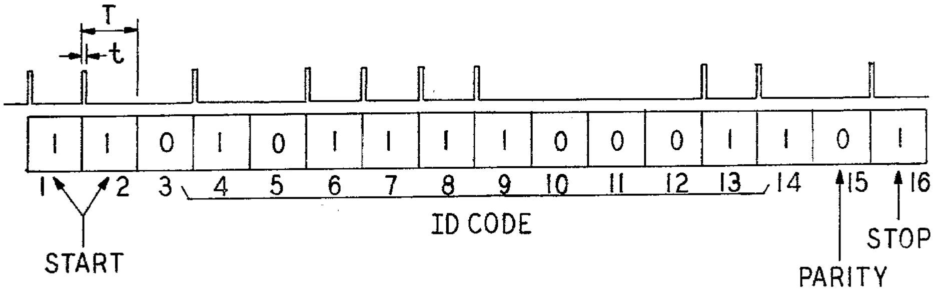
FIG. 6 shows the coded word structure used for communications between the transmitter and receiver units.

Each transmitter T1-T256 of FIG. 1 is digitally encoded and generates a unique binary code word. FIG. 6 is a representation of the binary word structure used. The user's identification code is specified by twelve binary bits (bits 3-14 of FIG. 6). This allows for 4096 distinct transmitter codes. In addition to the user's code, framing and parity bits are included. The framing bits (bits 1, 2, 16) enhance detectability while the parity bit (bit 15) provides error detection capability. To further aid framing, the word duty cycle is less than one-half.

Figure 11:
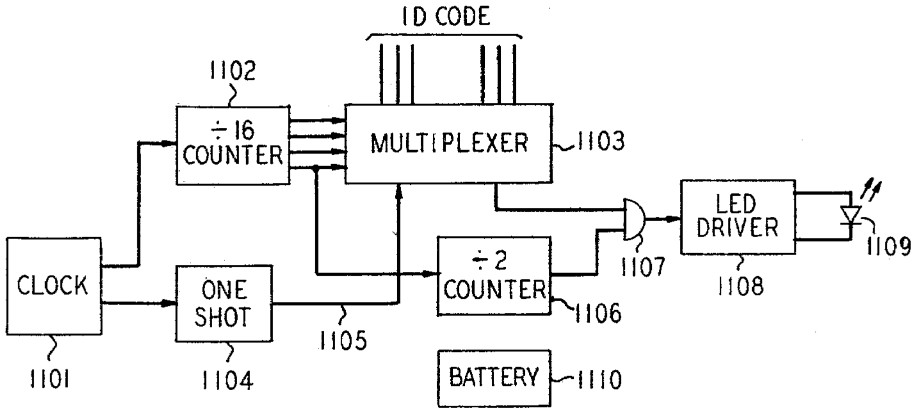
FIG. 11 shows a circuit diagram of a pulse amplitude modulated portable infrared transmitter unit.

Two well known data formats used for the transmission of information are shown in the preferred embodiments of the portable transmitter. A pulse amplitude modulation system utilizes amplitude discrimination to distinguish a "one" and a "zero". FIG. 6 illustrates a typical periodic burst of pulses representing the ID code where a pulse equals a logic "one" and the lack of a pulse equals a logic "zero". A transmitter for such a system is shown in FIG. 11 where clock 1101 provides the pulse repetition rate for the transmitter. Divide by 16 counter 1102 drives multiplexer 1103 which sequentially enters the user's identification code. The duty cycle (t divided by T of FIG. 6) of the transmitted infrared pulses is determined by one shot 1104 which narrows the duty cycle of the pulses out of clock 1101. The output of one shot 1104 strobes multiplexer 1103 via lead 1105. Thus, the output of multiplexer 1103 has the same pulse width as one shot 1105 and is gated with the output of a divide by 2 counter 1106. Divide by 2 counter 1106 is a periodic interrupter circuit which determines the period of time between the transmissions of burst of pulses representing the ID code. This rate also affects the overall transmission duty cycle. Using divide by 2 counter 1106 and an appropriate one shot 1104 pulse width, a transmission duty cycle of less than one percent can easily be constructed.

It is known that a reduced transmission duty cycle results in minimizing the power consumption of battery 1110 for a given infrared system range and signal to noise performance. The output of gate 1107 is connected to LED driver 1108 which drives infrared LED 1109. Battery 1110 supplies dc power to all the units of the infrared transmitter of FIG. 11. The power consumption of battery 1110 is determined primarily by the power consumption of infrared LED 1109. The power consumption is minimized by having a low transmission duty cycle which requires narrow infrared pulses. The minimum width of the infrared pulses is determined by the 3 db bandwidth characteristic of the infrared transmitter and infrared receiver devices utilized. Thus, by utilizing narrow pulse widths in a periodic transmitting pulse amplitude modulation system in which a lack of pulse indicates a logic "0" signal a very low power consumption infrared transmitter results.

A frequency shift keying (FSK) modulation format is also a practical implementation for infrared transmitter T1. In such a system infrared pulses which have a pulse rate of $f_O$ represent a logic 0 signal while infrared pulses having a pulse rate of $f_1$ represent a logic 1 signal. The number of pulses required to accurately convey the data is dependent on the background noise and the type of detector utilized in the infrared receiver. This FSK scheme allows the simultaneous use of several infrared communication systems multiplexed in frequency. For example, one system can utilize frequencies $f_0,f_1$ for logic 0 and logic 1 signals respectively and a second system can utilize frequencies $f_2,f_3$ for logic 0 and logic 1 signals respectively.

Figure 4:
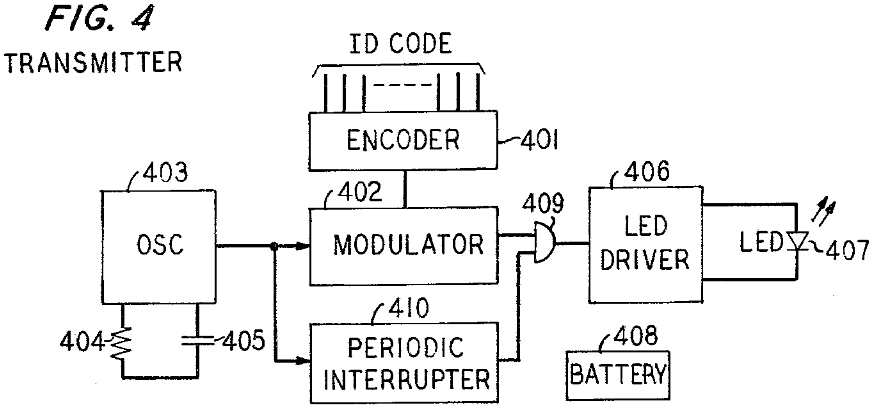
FIG. 4 shows a functional block diagram of a portable infrared transmitter unit.

A simplified block diagram of a FSK infrared PLS transmitter T1 is shown in FIG. 4. The transmitter utilizes encoder circuit 401 to input the data word and to perform a parallel to serial conversion. This function can be implemented using either a commercially available 16 bit multiplexer or shift register. The resulting serial baseband data drives modulator 402 which modulates a carrier signal from oscillator 403 providing efficient propagation and minimizing the effects of disturbing noise sources inherent in a communication system. Timing for encoder 401 and modulator 402 is provided by a well known oscillator circuit 403 having frequency determining elements resistor 404 and capacitor 405. In the FSK implementation oscillator 403 and modulator 402 circuitry can be implemented, for example, using a Signetics 564 phase locked loop or a Teledyne 9400 voltage to frequency converter. The particular encoder 401, modulator 402, and oscillator 403 circuitry used in the infrared transmitter is determined by the transmission data format selected and can be implemented in a variety of circuits that are well known in the art. The modulated signal from modulator 402 connects to gate 409 which is connected to the output of periodic interrupter 410. By making the transmitter of FIG. 4 periodic in operation a lower overall duty cycle, and hence lower power consumption can be accomplished, thus extending the life time of battery 408. The output of gate 409 is interfaced with infrared LED 407 by means of a standard driver circuit 406. Driver 406 provides a high current output buffer from modulator circuit 402 to infrared LED 407. Infrared LED 407 is a Western Electric M4231 infrared emitting diode. The power for the infrared transmitter unit T1 is supplied by a lightweight battery 408 included as part of transmitter T1.

Figure 7:
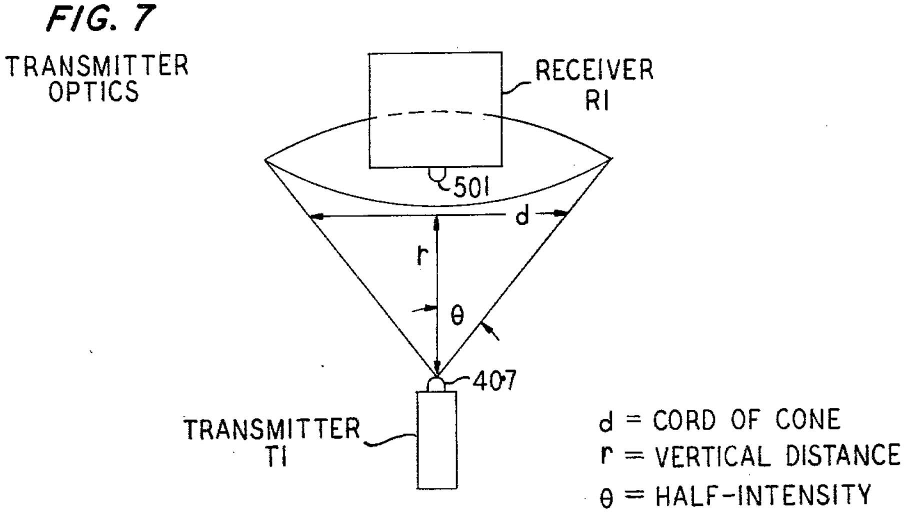
FIG. 7 shows the optical monitoring zone between the transmitter and receiver units.

The infrared transmitter of FIG. 2 is worn by the user with the LED oriented vertically. Each receiver as illustrated by R1 of FIG. 3, is usually located over a doorway or underpass. The optical requirements for the infrared PLS system are determined by this physical arrangement. FIG. 7 depicts, assuming no lenses at the receiver, the method used in determining the LED lens requirements. The minimum distance, r, between infrared LED 407 and receiver R1 and the maximum width of coverage, d, of receiver R1 is determined from the characteristics of infrared LED 407 and photodiode 501.

These optical specificatons along with the travelling velocity of the user determine the data rate of the transmitter. From the velocity of the user and the maximum desired width of coverage of the receiver an infrared communication channel will be established for a certain time period (TP). It is this time period TP in which the identification data must be communicated from transmitter T1 to receiver R1. For example, assume because of the one-half duty cycle, that at least five word transmission periods must occur while the user walks under a receiver. The words are 16 bits long, so an equivalent of 80 bits must be transmitted during time period TP. This time period TP relates then to a minimum transmission bit rate to assure transfer of information between transmitter T1 and receiver R1.

Since any surface having a temperature greater than absolute zero will radiate infrared energy, every person, piece of equipment, light, sun, etc., constitutes an infrared noise source to the disclosed system. However, since the radiant energy transmitted from an element varies with the fourth power of the element temperature only the hottest elements are of concern. To minimize the interference transmitter T1 and receiver R1 are arranged to radiate upward and receive downward respectively. This vertical arrangement will minimize some of the major infrared energy sources such as incandescent lights and sunlight. The placement of the receivers over doorways and the restriction of reception area "d" of FIG. 7 also helps to minimize the background infrared radiation from nearby equipment.

Since AC or pulse operated equipment emit modulated infrared radiation additional precautions to minimize these interference signals must be taken. The signal encoding and parity utilized helps to distinguish the infrared signals from these various modulated infrared noise sources.

The resulting infrared personnel locator system using an encoded and parity protected narrow beam width infrared signal provides the basis for a fast and accurate personnel locating system.

INFRARED RECEIVERS

The remote infrared receiver stations are strategically located throughout the facility. They convert the modulated infrared radiation into useful electrical signals.

Figure 5:
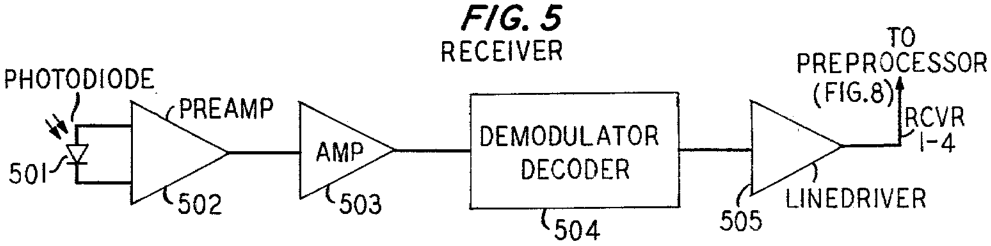
FIG. 5 shows a functional block diagram of a remote receiver station.

A block diagram of the receivers is shown in FIG. 5. Photodiode 501 detects the incident infrared radiation and converts it to an electrical current. Amplifiers 502 and 503 condition this signal before it is detected by demodulator/decoder 504. Demodulator/decoder 504 is a common variety type which is capable of demodulating and/or decoding the coded signals from the transmitter units. For example, the previously mentioned Signetics 564 phase locked loop or Teledyne 9400 voltage to frequency converters can be utilized as demodulator/decoder 504. Line driver 505 interfaces the detected signal with the transmission line to an associated preprocessor. Standard line driver circuit techniques are used to implement line driver 505. The receivers are powered from the central processor unit via the inside wiring.

PREPROCESSOR

Preprocessors P1-P256 provide a means whereby serial data, received and retransmitted by the remote infrared receiver stations is tested for validity and then converted into parallel data for further processing by master processor MP1.

The preprocessor performs the function of a universal asynchronous receiver/transmitter (UART), which is permanently fixed in the receive mode. An alternate embodiment includes a UART to communicate with each remote receiver. In such an arrangement each UART would connect directly to master processor MP1.

Figure 8:
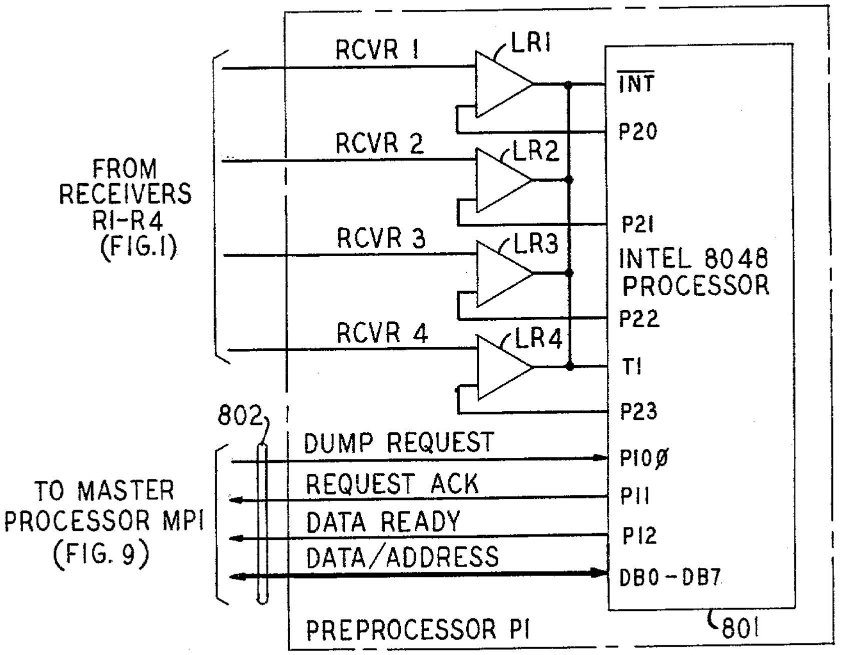
FIG. 8 shows a circuit diagram of a preprocessor of the control unit of the system.

FIG. 8 represents one possible implementation of a PLS preprocessor. Typically, microprocessor 801 would be of the "single chip" variety, including on-chip program and data memory. One such commercially available microprocessor which functions as a PLS preprocessor is INTEL's 8048 single chip 8-bit microprocessor shown in FIG. 10. The operating characteristics of the 8048 microprocessor is described in the *Intel Component Data Catalog* 1978 beginning on page 10–10, which description is incorporated herein by reference.

Interface with master processor MP1 is through an eight-bit parallel bus DATA/ADDRESS and other control leads 802. Serial data eminating from the infrared receivers is received through line receivers LR1–LR4 and processed through independent I/O ports (P20–P23) as indicated in FIG. 8. The inverted data from line receivers LR1–LR4 is connected to the $\overline{\text{INT}}$ and T1 inputs of microprocessor 801.

When a 16 bit serial data stream (FIG.6) is received, for example, from R1 an interrupt ($\overline{\text{INT}}$) signal to microprocessor 801 (FIG. 8) enables the loading of data from the active receiver R1. Microprocessor 801 frames the received data, ascertains the validity of the data and stores the data for later transmission to master processor MP1 over data bus DATA/ADDRESS. Preprocessor P1 of FIG. 8 is arranged to process simultaneously four individuals equipped with infrared transmitters walking simultaneously through four separate doors having remote receiver units.

As shown in FIG. 6, due to the asynchronous nature of transmissions (i.e., periodic transmissions) from the infrared transmitters information coding is in a start/-stop format, wherein a mark to space transition defines the beginning of message, and one or more mark bits signify the end of message. In the disclosed embodiments, shown in FIG. 6, two start, one stop, and one parity bit are utilized. The remaining 12 bits are utilized for transmitter identification (ID) codes. In some applications, it may be more appropriate to use the telephone extension number of the person to be located as the ID code. This choice would greatly enhance the automatic call forwarding capability of an infrared PLS/telephone switching network arrangement, such that an incoming call can be completed to a phone located near the called party. In such an arrangement the personnel location data obtained by the PLS would be shared with the telephone switching network. Additionally, in such an arrangement control unit C1 and master terminal MT1 of the PLS may be implemented as part of the control unit of the telephone switching network. Finally alerting units AD1–AD256 could include telephones located throughout the premises which are used to complete the calls forwarded to the called parties.

MASTER PROCESSOR

Although FIG. 1 illustrates control unit C1 including preprocessors P1–P256 connected to master processor MP1 it is obvious that one central processor could include the functions performed by preprocessors P1–P256 and master processor MP1.

Figure 9:
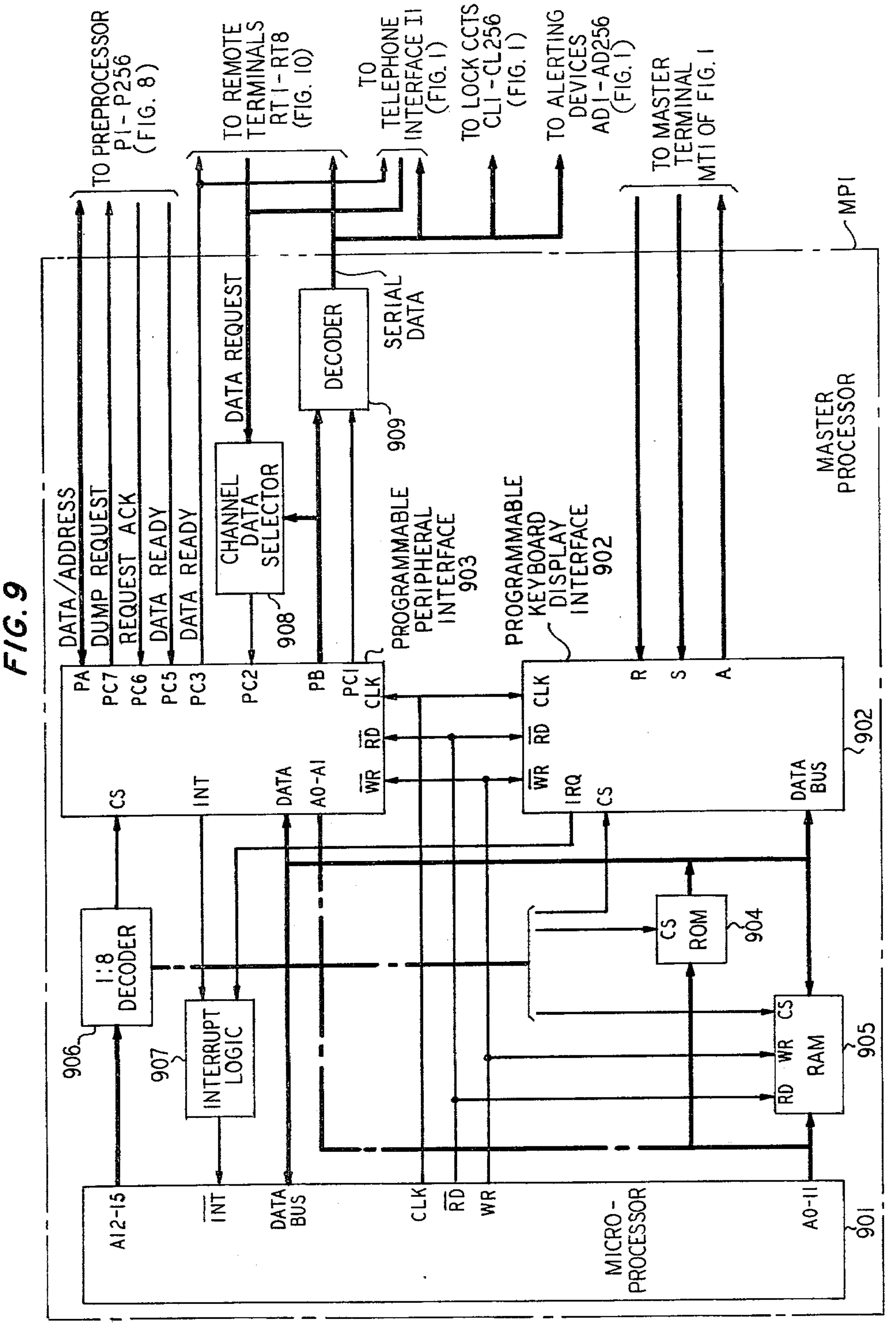
FIG. 9 shows a circuit diagram of the master processor of the control unit of the system.

The primary functions of master processor MP1 shown in FIG. 9 are: (1) to serve as depository for location information associated with the coded infrared transmitters and (2) to facilitate easy access to the stored location information by remote or local terminals.

Master processor MP1, illustrated in FIG. 9, includes a microprocessor 901 which is a Western Electric MAC-8 microprocessor in the disclosed embodiment. The basic operation of a MAC-8 microprocessor is described in the article "MAC-8: A Microprocessor for Telecommunication Applications", *The Western Electric Engineer,* at page 41 et seq., July 1977 by Herbert H. Winfield, which is incorporated herein by reference.

Programmable keyboard display interface 902 is implemented using an Intel 8279 integrated circuit as described on page 12–198 et seq., of the above-identified Intel catalog which description is incorporated herein by reference. Programmable peripheral interface 903 is implemented using an Intel 8255A integrated circuit as described on page 12–76 et seq., of the above-identified Intel catalog which description is incorporated herein by reference. Read only memory ROM 904 and random access memory RAM 905 provide for program and data storage and are expandable to assure that the infrared PLS can accommodate the specific user's needs. Various other circuits such as decoder 906 and interrupt logic 907 provide for compatible connections between the various components of master processor MP1. Channel selector 908 and decoder 909 provide a multiplexing/demultiplexing access of remote terminals. RT1–RT8 to programmable peripheral interface 903.

The above-described components of master processor MP1 connected as shown in FIG. 9, functioning both as described in their respective data sheets and as described under the program control of microprocessor 901, provides the tasks desired of the disclosed infrared PLS. Master processor MP1 accomplishes these tasks by receiving transmitter location information from preprocessors P1–P256 through a common parallel data bus DATA/ADDRESS. The location data is then augmented with time-of-day information and the augmented location data is transferred to master processor's (MP1) data memory. Data transfer from preprocessor to master processor MP1 is accomplished through a combination of well known polled and interrupt initiated data transfer techniques.

When a request to locate a specific infrared transmitter is initiated by a remote terminal R1–RT25 of FIG. 1, master processor MP1 immediately searches its data memory to locate the subject identification code. The master processor MP1 is programmed to search various lookup tables which associate person/transmitter data, transmitter/remote receiver data both past and present, and the associated time of day of the various data entries. Should this search fail in locating the ID code, master processor MP1 sends a request to all preprocessors (P1–P256) to assist in the search. When the sought after ID code is finally located, it is transferred to master processor MP1 and relayed to the requesting remote terminal (RT1–RT25).

Master processor MP1 of FIG. 9 can also be implemented in other well known arrangements using standard commercially available components.

MASTER TERMINAL

As shown in FIG. 1 master terminal MT1 includes a CRT display and keyboard for interfacing with master processor MP1. Information requests or changes in identification codes are entered via the keyboard of master terminal MT1 and the corresponding data tables are updated with the new data. The CRT displays the identity of each transmitter, its past and present location and the time of entry of various data. Standard computer data entry retrieval and display formats are applicable to the disclosed infrared PLS system and are easily modified to suit particular infrared PLS applications.

TELEPHONE INTERFACE

Telephone interface I1 of FIG. 1 illustrates a device to interface a telephone switching network to the infrared personnel locating system. The technique of designing a particular interface I1 is well known and depends on the particular characteristics of the telephone switching network and master processor MP1 utilized. As shown in FIG. 9, telephone interface I1 can be connected to master processor MP1 utilizing channel data selector 908 and decoder 909.

REMOTE TERMINALS

Figure 10:
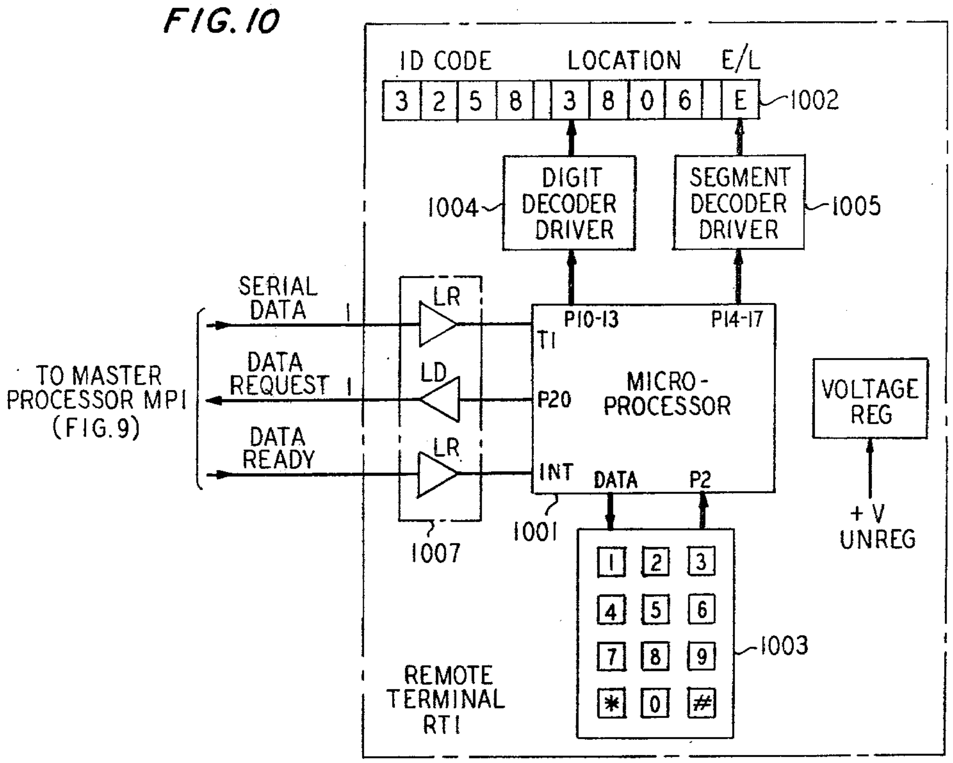
FIG. 10 shows a circuit diagram of a remote data access terminal of the system.

Remote terminals, RT1–RT8 of FIG. 1, are used throughout the infrared PLS to provide convenient access to master processor MP1 for the purpose of locating a person. FIG. 10 is a block diagram representation of a typical terminal consisting of a single chip (Intel 8048) microcomputer 1001 for providing the intelligence, an alphanumeric display 1002 for visual conveyance of personnel ID code and location information and a keyboard 1003 for entering user inputs. Digit decoder 1004 and segment decoder 1005 provide in a well known manner the proper signals to operate display 1002. Voltage regulator 1006 provides power to the various units of remote terminal RT1.

Microprocessor 1001 communicates with master processor MP1 over various control leads and data bus (1008) that are buffered by line drivers 1007. The typical signal timing and operation of microprocessor 1001 is described in *Intel Component Data Catalog* 1978 starting on page 10–10.

To locate an individual who is equipped with an infrared transmitter, the remote terminal operator would simply have to enter an identification code via keyboard 903 and wait for a reply on display 902. With reference to display 1002 of FIG. 10, note that four digits are allocated for location information, four digits for an ID code (which may be the person's permanent extension number) and one digit E/L to indicate whether location or extension is being displayed. The purpose of extension/location indicator (E/L) is to enable the operator to request not only the location of a person, but also the nearest telephone to that person so that he may be reached quickly in emergency situations. If programmed master processor MP1 can automatically dial the nearest telephone once the ID code of the person to be located is keyed in by the operator of remote terminal RT1.

ALERTING DEVICE

Alerting devices AD1–AD256 of FIG. 1 are activated selectively by master processor MP1 to alert an individual that someone is attempting to contact that individual. These alerting devices can be implemented as a selective public address system, coded lamp display, coded buzzer or as a telephone. When alerted the paged individual could pick up a convenient telephone to speak to the calling party. As shown in FIG. 9, these alerting devices AD1–AD256 can be connected to master processor MP1 through decoder 909.

LOCKING DEVICE

Controllable locking devices CL1–CL25 of FIG. 1 are locks that are controllable from master processor MP1. Master processor MP1 is programmed to restrict certain individuals, as identified by their transmitter ID codes, from entering certain secure areas. When an individual having the proper clearance approaches a locked area or cabinet the appropriate lock releases enabling entry into the protected area. Additionally, this protection can be programmed to vary the area and time of coverage by the infrared PLS. As shown in FIG. 9, these locking devices CL1–CL25 can be connected to master processor MP1 through decoder 909.

The disclosed infrared PLS of FIG. 1 is flexible in structure and the particular requirements of a user will dictate the number of infrared transmitters T1–T256, infrared receivers R1–R2564, remote terminals RT1–RT8, alerting devices AD1–AD256 and controllable locks CL1–CL256 needed in a particular application. Likewise, the structure of control unit C1 will vary, the number of preprocessors P1–P256 and the size of ROM and RAM memories changing according to the particular application.

The inventive disclosed infrared personnel locating system (PLS) utilizes infrared and microcomputer technologies to provide quick and efficient means of locating personnel within a facility. While only a few embodiments of the present invention have been illustrated and described the general concept conveyed enables those persons skilled in the art to modify and change the embodiment of the infrared PLS without deviating from the scope and spirit of the invention.

I claim:

1. A personnel locator system installable on a premises comprising a plurality of portable communication units, each adapted to be carried by an individual, a plurality of remote stations mounted in appropriate locations about the premises and a common control unit

CHARACTERIZED IN THAT each portable unit including means for establishing a coded signal unique to that unit, means coupled to said establishing means and responsive to said coded signal for generating a modulated pulse coded infrared signal unique to each said portable unit, battery means for providing power from an included battery source to power said portable unit;

each remote station including means responsive to received infrared signals from a portable unit for generating a corresponding coded signal identifying each said portable unit, and means for transmitting said generated corresponding coded portable unit signal to said common control unit; and said control unit including means for associating said generated corresponding coded portable unit signal with a remote station, and means for indicating the location of each portable unit, 2. The personnel locator system of claim 1

CHARACTERIZED IN THAT said generating means of said portable unit is a pulse amplitude modulation circuit for producing either a pulse corresponding to a logic "1" signal or an absence of a pulse corresponding to a logic "0" signal for each bit of said unique coded signal.

3. The personnel locator system of claim 1

CHARACTERIZED IN THAT said generating means of said portable unit is a frequency shift keying modulation circuit for producing either a pulse of one frequency corresponding to a logic "1" signal or a pulse of a second frequency corresponding to a logic "0" signal for each bit of said unique coded signal.

4. The personnel locator system of claim 1 CHARACTERIZED IN THAT each remote station includes means for generating an address code identifying said remote station, and means for combining said portable unit code and said address code for transmission by said transmission means to said control unit.

5. The personnel locator system of claim 1 CHARACTERIZED IN THAT said control unit includes information storage means for storing both the portable unit identification code and remote station address, data entry means coupled to said information storage means for entering data into said information storage means, and display means coupled to said information storage means for displaying the existing remote address of the remote station closest to each portable unit.

6. The personnel locator system of claim 1 CHARACTERIZED IN THAT said information storage means stores the time of day when a remote address associated with each portable unit changes.

7. The personnel locator system of claim 1 CHARACTERIZED IN THAT said system provides an alerting feature which includes a plurality of alerting means each associated with one of said remote stations, and said control unit includes means for selectively alerting from said data entry means that alerting means associated with a remote station which is closest to the portable unit as determined by information in said information storage means.

8. The personnel locator system of claim 7 CHARACTERIZED IN THAT said control unit includes means for interfacing an automatic telephone switching network to said control unit, said switching network automatically controlling said alerting means associated with the existing location of a portable unit carried by a person to be located by said switching network.

9. The personnel locator system of claim 1 CHARACTERIZED IN THAT said system provides an access limitation feature which includes a plurality of locking means each associated with an area desired to be secure from unauthorized entry; and said control unit further includes authorization means included in said information storage means for storing authorization data associated with each portable unit and address code of station associated with each locking means, and means for controlling said locking means according to said authorization means associated with each portable unit.

10. The personnel locator system of claim 1 CHARACTERIZED IN THAT said control unit includes scanning means for periodically scanning each remote station to receive any coded signals identifying any portable unit codes.

11. The personnel locator system of claim 1 CHARACTERIZED IN THAT said control unit includes a preprocessor means and a master processor means said preprocessor means includes means for checking the validity of signals received from an associated group of remote stations, and means for converting said remote station signals for transmission to said master processor means; and said master processor means includes information storage means for storing the portable unit code and remote address, data entry means for entering data into said information storage means, and display means coupled to said information storage means for displaying the current address code of the remote station closest to each portable unit.

12. The personnel locator system of claim 1 CHARACTERIZED IN THAT said system includes remote terminal means which includes access means for requesting from said control unit information associated with a portable unit, and display means for displaying information requested by said access means.

13. The personnel locator system of claim 1 CHARACTERIZED IN THAT said portable unit is arranged to be worn such that said infrared signal is transmitted in a substantially upward vertical direction, and said remote station is arranged to receive said infrared signal in a vertical direction from said portable unit.

14. The personnel locator system of claim 1 CHARACTERIZED IN THAT said portable unit periodically generates said pulse coded infrared signals.

15. The personnel locator system of claim 14 CHARACTERIZED IN THAT said periodic pulse coded infrared signals include parity and framing pulses.

16. The personnel locator system of claim 1 CHARACTERIZED IN THAT said generating means of said portable unit includes an infrared light emitting diode.

17. The personnel locator system of claim 1 CHARACTERIZED IN THAT said pulse coded infrared signal from each portable unit is a telephone extension number of a telephone switching system interfaced to said locator system.

18. The personnel locator system of claim 1 CHARACTERIZED IN THAT said infrared pulse signal transmitted from said portable unit is selected to be equal to the narrowest width infrared pulse signal which can be both transmitted using said infrared transmission means and received by said infrared responsive means of said remote station thereby minimizing the overall dc power requirements of said portable unit for a given said infrared responsive means transmission range, receiver signal to noise ratio and time period between pulse signals.

19. An automatic telephone call forwarding system for ringing a selected telephone of a group of telephones on a premises served by said system, said ringing telephone selected according to the present location of the person associated with the called telephone number as determined from a data base established by an included personnel locator arrangement

CHARACTERIZED IN THAT said personnel locator arrangement includes a plurality of portable battery powered infrared communication units each adapted to be carried by a person desiring a telephone call forwarding capability said communication units arranged to periodically transmit a unique pulse coded infrared signal, and a plurality of remote infrared communication stations mounted throughout a premises and arranged to receive said unique infrared signal from said portable units and transmit a composite signal identifying said remote station and said portable unit to a common control unit having a data base defining the telephone station associated with said remote station defining the present location of the person carrying said portable units; and said call forwarding system further includes means for accessing said data base of said common control unit in response to a received telephone call for determining the appropriate telephone to ring to locate the person associated with the called telephone station.

20. The automatic telephone call forwarding system of claim 19

CHARACTERIZED IN THAT said portable units utilize a pulse amplitude modulation circuit for producing either a pulse corresponding to a logic "1" signal or an absence of a pulse corresponding to a logic "0" signal for each bit of said unique coded infrared signal.

21. The automatic telephone call forwarding system of claim 19

CHARACTERIZED IN THAT said portable units utilize a frequency shift keying modulation circuit for producing either a pulse of one frequency corresponding to a logic "1" signal or a pulse of a second frequency corresponding to a logic "0" signal for each bit of said unique coded infrared signal.

22. A personnel locating system for locating a person carrying a portable transmitter unit which emits a unique signal identifying the transmitter unit to a plurality of remote receiving stations located about a premises said locating system comprising:

a plurality of portable battery powered infrared transmitters arranged to periodically transmit unique pulse coded infrared signals having binary state amplitude modulation signal including the transmitter identification code and framing information;

a plurality of remote receiving stations for receiving said infrared signals and transmitting a composite signal indicative of said received infrared signal and address of said receiving station; and a common control unit arranged to receive said composite signals from said remote receiving stations, said control unit including means for storing transmitter and remote station data in a data file, and means for displaying said data file.

* * * * *